United States Patent [19]

Le Goff

[11] 4,211,474
[45] Jul. 8, 1980

[54] ULTRA-RAPID ELECTRO-OPTICAL SHUTTER

[75] Inventor: Denis Le Goff, St Cyr L'Ecole, France

[73] Assignee: Compagnie Generale d'Electricite, Paris, France

[21] Appl. No.: 871,883

[22] Filed: Jan. 24, 1978

[30] Foreign Application Priority Data

Jan. 31, 1977 [FR] France ............................ 77 02577

[51] Int. Cl.$^2$ ................................................ G02F 1/03
[52] U.S. Cl. ................................ 350/356; 331/94.5 M
[58] Field of Search ............... 331/94.5 MQ; 350/353, 350/354, 355, 356

[56] References Cited

PUBLICATIONS

P. LeFur et al., A Kilovolt Picosecond Optoelectronic Switch and Pockel's Cell, Appl. Phys. Lett., vol. 28, No. 1, (Jan. 1, 1976), pp. 21–23.

*Primary Examiner*—William L. Sikes
*Attorney, Agent, or Firm*—Sughrue, Rothwell, Mion, Zinn and Macpeak

[57] ABSTRACT

An ultra-rapid electro-optical shutter comprises an electro-optical crystal which receives an incident beam and is able to transmit it when an electric field is applied thereto. The crystal has an electrode disposed on one of its surfaces, with a first silicon joint disposed between two parts of this electrode. An electric field is created in use by applying a voltage between one of the parts of the electrode and the surface of the crystal opposite to that on which the electrode is disposed. A first light beam is used to switch the silicon joint electrically on and off thereby passing and blocking the passage of a second beam through the crystal. The beams may be lasers.

5 Claims, 1 Drawing Figure

U.S. Patent
Jul. 8, 1980
4,211,474
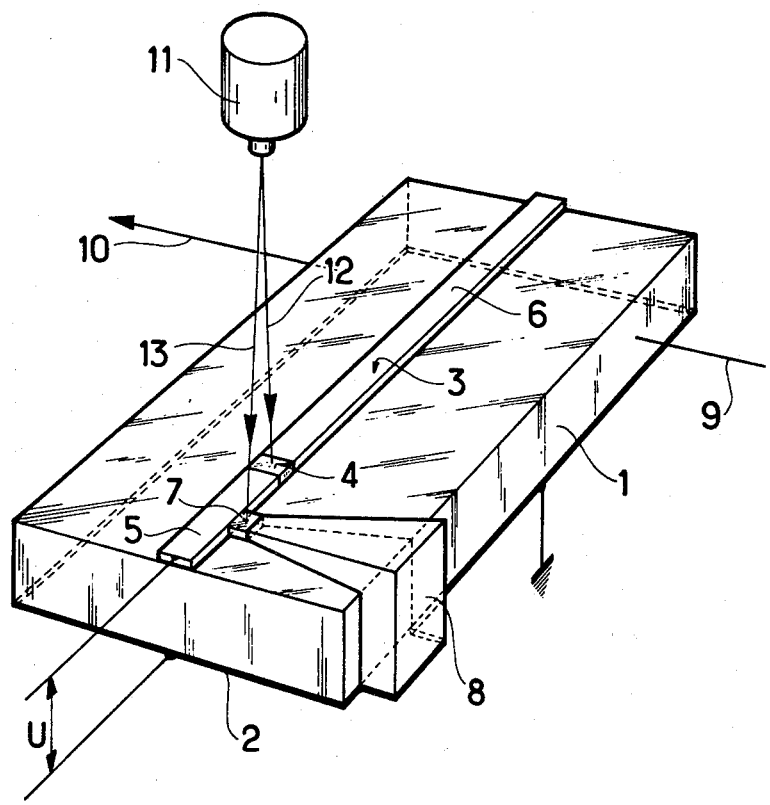

ULTRA-RAPID ELECTRO-OPTICAL SHUTTER

FIELD OF THE INVENTION

The invention relates to an ultra-rapid electro-optical shutter suitable for operating in the picosecond range.

BACKGROUND OF THE INVENTION

An electro-optical shutter comprises an electro-optical crystal suitable for transmitting or blocking a light beam according to whether or not it is subjected to an electric field. Such a crystal which therefore operates on the Pockel (or Kerr) effect is associated with means which can transmit or interrupt the electric field.

Generally, the crystal is a niobate or a tantalate, while the previously mentioned means is a silicon switch which is made conductive by application of an optical signal.

However in known shutters, an impedance discontinuity is observed at the junction between the silicon and the crystal, this discontinuity being due to the difference between their dielectric constants. A deterioration of the electric signal and an appreciable loss of energy result therefrom.

Further it is observed that it is difficult to increase the dimensions of the electric crystal to make it compatible with the diameter of said light beam.

Preferred embodiments of the present invention remedy these drawbacks and provide a shutter which is suitable for operating reliably and without disturbance within the pico-second range and with high energy efficiency.

SUMMARY OF THE INVENTION

The present invention provides an electro-optical shutter comprising an electro-optical crystal capable of transmitting an incident light beam when an electric field is applied to the crystal, the shutter further comprising an electrode disposed on one of the surfaces of the crystal and in electrical contact with that surface, a first joint made of a material suitable for being rendered conductive to electrons under the influence of light being interposed in this electrode and dividing it into two parts, the electric field being created in operation by applying a voltage between one of the parts of said electrode and the face of the crystal opposed to that on which the said electrode is disposed.

BRIEF DESCRIPTION OF THE DRAWING

Other characteristics and advantages of the invention become apparent from the following description given by way of a purely illustrative example but having no limiting character, with reference to the perspective view constituting sole FIGURE of the accompanying drawing.

DESCRIPTION OF THE PREFERRED EMBODIMENT

The FIGURE shows an electro-optical crystal 1 made of lithium niobate or tantalate, one of whose surfaces is covered with a thin conductive layer 2, made of silver for example, while the opposite surface carries an electrode 3 made of brass for example and in electrical contact with the crystal. A first silicon joint 4 is disposed within this electrode and divides it into two parts 5 and 6, while a second silicon joint 7 is disposed between said electrode part 5 and a conductor 8 connected to the conductive layer 2.

Further, a voltage U can be applied between the part 5 of the electrode 3 and the thin layer 2, it being possible to pick up a signal between the part 6 of the electrode 3 and the thin layer 2. The incident light beam to be modulated, in particular a laser beam, is schematized at 9, the transmitted beam being referenced 10.

Lastly, reference 11 designates for example a laser generator suitable for emitting laser beam 12 or 13 on to the joints 4 and 7 respectively and vice versa.

Such a device operates as follows:

When the laser generator 11 emits the beam 12 the silicon joint 4 provides electrical connection between the parts 5 and 6 of the electrode 3. The crystal 1 is therefore polarized by the electric field thus created and the beam 9 is transmitted at 10 through the crystal 1.

Conversely, when the generator 11 emits the beam 13, the silicon joint 7 co-operating with the conductor 8 shortcircuits the part 5 of the electrode 3 to the conductive layer 2 thus rapidly interrupting the electric field and the polarisation of the crystal 1. The beam 9 is therefore no longer transmitted through the crystal 1.

Of course, the beams 12 and 13 can be emitted respectively by distinct sources.

The device in accordance with the invention therefore makes it possible to interrupt an ultra-rapid manner or to modulate a light beam within the picosecond range.

Further, it is seen that the dielectric constant is the same along the whole assembly, this avoiding any disturbance of the electric signal and consequently any loss of energy. Further, no limitation is imposed on the electro-optical crystal.

Advantageous applications are found for the invention in laser technology in general.

What is claimed is:

1. An electro-optical shutter comprising an electro-optical crystal plate capable of transmitting through its thickness an incident light beam when an electric field is applied to opposed first and second plate faces, said shutter comprising:
   - a first electrode disposed on said first plate face, said first electrode comprising an elongated strip, disposed on said first plate face, said strip being separated into two aligned parts and forming a gap therebetween,
   - a second electrode opposed to said first electrode and disposed on said second plate face,
   - a first joint made of a material capable of being rendered conductive to electrons under the influence of light and disposed between said two parts, and within said gap, and
   - means for applying a voltage between one of the parts of said first electrode and said second electrode to thereby create said electric field.

2. A shutter according to claim 1, further including a second joint capable of being rendered conductive to electrons under the influence of light, said second joint being disposed between said first electrode and an electric conductor connected to the surface of the crystal opposite to that on which said first electrode is disposed.

3. A shutter according to claim 2, wherein said first and second joints are made of silicon.

4. A shutter according to claim 1, wherein said electro-optical crystal is made of one material of the group consisting of lithium niobate and tantalate.

5. A shutter according to claim 1, further comprising laser sources for emitting said light beam as well as said light applied to at least one of said joints.

* * * * *